(12) United States Patent
Fréchette

(10) Patent No.: US 11,678,649 B2
(45) Date of Patent: Jun. 20, 2023

(54) ADJUSTABLE NATURAL CULLING OF MUSSEL POPULATION ON MUSSEL-CULTURE ROPES

(71) Applicant: R-D Mytis Ltd., Mont-Joli (CA)

(72) Inventor: Marcel Fréchette, Mont-Joli (CA)

(*) Notice: Subject to any disclaimer, the term of this patent is extended or adjusted under 35 U.S.C. 154(b) by 471 days.

(21) Appl. No.: 16/974,038

(22) PCT Filed: Mar. 21, 2019

(86) PCT No.: PCT/CA2019/000037
§ 371 (c)(1),
(2) Date: Sep. 14, 2020

(87) PCT Pub. No.: WO2019/195913
PCT Pub. Date: Oct. 17, 2019

(65) Prior Publication Data
US 2021/0368746 A1    Dec. 2, 2021

Related U.S. Application Data

(60) Provisional application No. 62/761,882, filed on Apr. 11, 2018.

(51) Int. Cl.
*A01K 61/55* (2017.01)
(52) U.S. Cl.
CPC ............................. *A01K 61/55* (2017.01)
(58) Field of Classification Search
CPC ........................................... A01K 61/55
USPC ............................................. 119/234
See application file for complete search history.

(56) References Cited

U.S. PATENT DOCUMENTS

| | | | | |
|---|---|---|---|---|
| 2,939,248 A | * | 6/1960 | Beck | A01G 2/20 47/20.1 |
| 5,515,813 A | * | 5/1996 | Wilkerson | A01K 61/54 119/237 |
| 7,941,966 B2 | * | 5/2011 | Foix Robert | A01G 13/043 47/20.1 |
| 2006/0165925 A1 | | 7/2006 | Shelby | |
| 2007/0028849 A1 | * | 2/2007 | Kvietelaitis | A01K 61/54 119/237 |
| 2007/0256642 A1 | * | 11/2007 | Kvietelaitis | A01K 61/54 119/238 |

(Continued)

FOREIGN PATENT DOCUMENTS

| | | |
|---|---|---|
| AU | 2002022982 | 6/2004 |
| CA | 2178203 | 6/1995 |

(Continued)

*Primary Examiner* — Monica L Perry
*Assistant Examiner* — Brittany A Lowery
(74) *Attorney, Agent, or Firm* — Mario Theriault

(57) ABSTRACT

A method for naturally culling mussel population on a mussel-culture rope, comprising the steps of installing a predator guard around the mussel-culture rope; and during the step of installing, adjusting a degree of mussel protection of that predator guard. In one aspect, the step of adjusting comprises the steps of opening and adjusting a size of a breach in the predator guard. In another aspect, the predator guard is made of an elongated hemicylindroidal mesh-like element with an open side. The hemicylindroidal element has flaps bordering the open side. The flaps constitute duck-mobility impediments for limiting without completely precluding predation by diving ducks.

4 Claims, 3 Drawing Sheets

(56) References Cited

U.S. PATENT DOCUMENTS

2017/0196206 A1\* 7/2017 Ross .................. A01K 61/75

FOREIGN PATENT DOCUMENTS

| | | | |
|---|---|---|---|
| CA | 2332086 | 4/2001 | |
| CA | 2420918 | 9/2003 | |
| CA | 2535821 | 3/2005 | |
| CA | 2556556 | 9/2005 | |
| CA | 2489721 | 4/2006 | |
| CA | 2905179 | 1/2017 | |
| FR | 2307465 | 12/1976 | |
| FR | 2636206 | 3/1990 | |
| FR | 2721478 A1 \* | 12/1995 | ........... A01K 61/002 |
| WO | WO 2009/009838 | 1/2009 | |

\* cited by examiner

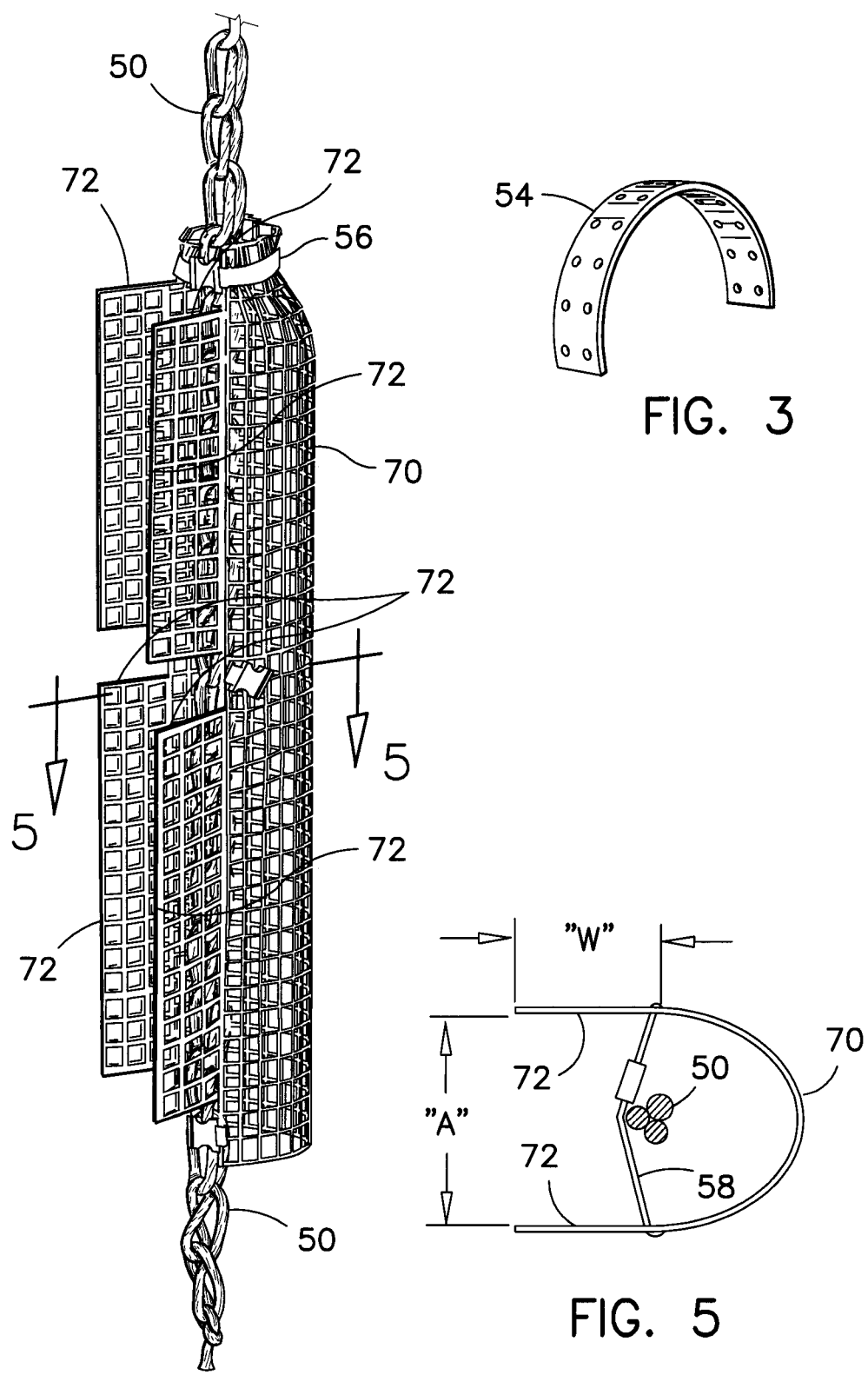

ADJUSTABLE NATURAL CULLING OF MUSSEL POPULATION ON MUSSEL-CULTURE ROPES

The present application claims the benefit of U.S. Provisional Application No. 62/761,882, filed Apr. 11, 2018.

FIELD OF THE INVENTION

This invention pertains to methods of aquaculture, and more particularly, it pertains to methods and equipment for naturally culling mussel population on mussel-culture ropes.

BACKGROUND OF THE INVENTION

Mussel-culture ropes are hung underwater from various structures such as a raft or a long horizontal rope referred to in the field as a "mainline". Buoyancy devices are tied to the mainline with the culture ropes hanging vertically below the mainline. For example, a mussel culture installation is illustrated and described in CA 2,535,821 published on Mar. 24, 2005 by Peter Kvietelaitis.

In nature, wild mussel spat or "seeds" settle on the culture ropes at the end of the larvae life. Subsequently to spat collection, the mussels are either left to grow on the culture ropes; transferred to tubular sock-like netting, or left on the ropes and encapsulated into tubular sock-like netting. Traditionally, the netting is made of plastic or cotton which eventually dissolves to facilitate harvest. Some of these netting types offer protection to the juvenile mussels against predators such as diving duck and finfish.

Amongst the factors affecting crop yields, there are of course; water quality, and the abundance of food at a particular site. There are, however, three additional factors that can bring about great losses in mussel culture despite enjoying a perfect culture site. Some of these factors are: limited attachment surface area provided by the culture ropes; predation of juvenile mussels by finfish and diving ducks; and the rubbing of culture ropes against each other in rough seas.

Referring to the first disadvantage, population density on a mussel collector undergoes a self-thinning process as mussels grow. Some fall off the culture ropes because of a lack of substrate surface area to attach themselves to. Mussels falling off the ropes are destroyed by crabs, starfish and other animals living in the sea floor habitat.

In rough seas, suspended culture ropes are sometime brought closer to each other than their initial setting. Plain ropes offer no hollow, crevice or cavity to shelter and to protect cultured mussels from being scraped off the ropes during the rubbing of these ropes against each other. Knotted ropes, such as those described in CA 2,905,179, issued on Jan. 17, 2017 to the present applicant, offer an improved attachment area, present crevices and hollows to shelter mussels against predators, and prevent, to a certain extent the loss of mussels during storms.

Despite all the advances in the aquaculture industry, a better protection of mussels on a culture rope using sock-like netting sleeves for example, does not guarantee a better yield at harvest time. In cases where ropes are initially overstocked, a better protection during the growth cycle generally results in an overpopulation of mussels on the ropes, slower growth, and more detachments from the ropes.

Therefore, it is believed that there is a need in the aquaculture industry for a predator guard which does not completely preclude diving ducks and other aquatic animals to feed on farmed mussel. There is a need for a predator guard which allows predators to reduce to a certain extent population densities on culture ropes, to enhance growth of the remaining mussels, and to provide a profitable harvest.

The following documents represent a good inventory of predator guards found in the prior art, for use in the mussel culture industry.

CA Patent 2,178,203 issued to J. D. Saxby et al., on Jun. 15, 1995.

This document discloses a method for cultivating mollusks using a netting bag suspended horizontally under water.

CA Patent 2,489,721 issued to K. Ferguson, on Apr. 25, 2006. This patent describes a mussel sock made of a first material and a second weaker material. The weaker material eventually degrades and breaks, allowing the sock to expand, giving more space inside the sock for the mussels to grow.

CA Patent Application 2,535,821 filed by P. Kvietelaitis, on Sep. 10, 2004. This document discloses culture ropes suspended underwater to a mainline supported by buoys. The culture ropes are encapsulated in netting socks.

CA Patent Application 2,556,556 filed by P. Kvietelaitis on Feb. 18, 2005. This document discloses an apparatus and a method for seeding and encapsulating a culture rope with young mussels.

FR 2,307,465, published by G. Bouyé on Nov. 12, 1976.

This document describes different posts for the culture of mussels. These posts are fitted with cylindrical sleeves. Mussel spat ropes are attached on the outside of the sleeves. As best understood, predator shields protect the mussels from bottom-dwelling predators and are placed at the top and bottom ends of the sleeves because the sleeves are turned upside-down and replaced on the posts at intervals in time.

FR 2,636,206, published by P. L'Honneur on Mar. 16, 1990;

This document discloses a tubular predator protection net for mussel culture rope. The net is made of juxtaposed lengthwise strips, where some strips are degradable and some strips are made of a more durable material. In time, slots are made along the length of the net as the degradable strips decompose.

CA 2,178,203, published by D. J. Saxby et al., on Jun. 15, 1995;

This publication describes a shellfish culture and harvesting system for supporting oysters in tubular horizontal bags. The bags have a slit there along through which oysters can be inspected.

CA 2,332,086 published by Ian W. Jefferds on Apr. 26, 2001;

This patent discloses discs placed at intervals along a culture rope to support mussel clusters, and to a certain extent prevent detachment of mussels from the ropes in rough seas.

CA 2,420,918 published by G. Gagnon on Sep. 14, 2003;

This document discloses different structure of discs for supporting mollusks along a culture rope.

AU 2002022982 published by R. Buono on Jun. 24, 2004;

This document discloses a tubular predator protection net encasing a culture rope. The netting has a coarse strand netting and degradable fine strand netting.

US 2006/0165925 published by J. A. Shelby on Jul. 27, 2006;

This document describes a netting bag for the culture of mussels. The seam of the bag is made of degradable cord that disintegrates as mussels grow.

WO 2009/009838, published by P. Kvietelaitis on Jan. 22, 2009.

This document disclosed a tubular netting oversock to protect mussels from predators. The tubular oversock is formed from a flat sheet. The edges of the oversock may or may not overlap each other at the seam. The tubular shape is retained by twine ties at intervals.

It will be appreciated that the prior art devices contains two types of predator guards. A first type completely encloses the culture ropes; and the second type has portions that decompose in time to facilitate harvest.

With sock-type netting for example, mussel ropes are given full shelter from ducks, thus allowing mussel population on the ropes to thrive. In some cases, however, the opposite occurs. Mussel population density may be too high. Typically, too high a population density entails a self-thinning process whereby mussels fall to the bottom. If ropes are fully enclosed into nets, detaching mussels are retained within the bottom of the nets. This potentially exacerbates population on the ropes and potentially results in reduced growth and lower mussel quality.

When open-bottom netting sleeves are used, detaching mussels are eaten by bottom-dwelling predators or suffocate in the sediments below the culture gear, resulting in increased input of organic matter to the bottom and impacting environment quality.

In the second type of predator guards which erode in time, and form breaches therein, it is understood that the formation of these breaches in the prior art predator guards allow total net volume to expand as mussel grow and that the purpose of the predator guards is to reduce predator-related and fall-off related mussel losses.

It is believed that there is still a need in the aquaculture industry for a predator guard of which the degree of protection can be adjusted upon installation, for allowing a certain degree of natural culling to be made on the mussel population in a mussel-culture farm.

SUMMARY OF THE INVENTION

In the present invention, there is provided a predator guard that is selectively adjustable during installation. The degree of openness of the guard is adjusted according to experience acquired at a culture site. The size of a breach in a predator guard is adjusted according to the number of predators in the area, and according to the fertility of the site. The breach in the predator guard allows a certain amount of losses by natural culling, to ensure profitability of the farm and to ensure a healthy diversity of life species at the culture site.

In one aspect of the present invention, there is provided a method for naturally culling mussel population on a mussel-culture rope, comprising the steps of installing a predator guard around the mussel-culture rope; and during the step of installing, adjusting a degree of mussel protection of that predator guard.

In another aspect of the present invention, the step of adjusting comprises the steps of opening and adjusting a size of a breach in the predator guard.

In yet another aspect of the present invention, the step of adjusting comprises the step of installing duck-swimming obstructions near the aforesaid breach.

In a further aspect of the present invention, there is provided a predator guard for naturally controlling predation on a mussel-culture rope, comprising a first elongated hemicylindroidal mesh-like surface and strap and buckle fasteners along top and bottom regions thereof for retaining the predator guard to a mussel-culture rope.

In yet another aspect of the present invention, the predator guard has a central strap and buckle fastener along a central portion thereof, and this central strap is configured for crumpling the central region thereof, and opening a protection breach therealong.

In yet a further aspect of the present invention, the elongated hemicylindroidal mesh-like surface has a first open side there along and this first open side is bordered by flaps of mesh-like surface.

In the presence of predators, hemicylindroidal netting surface allows predators limited access to the mussels. Predators check population density to acceptable levels and benefits are incurred for both the industry and the environment. Benefit to the industry are higher yield and profitability. Benefits to the environment are higher food access for ducks and reduced disposal of organic matter to the bottom of the sea.

The hemicylindroidal elements also offer protection of the cultured mussels against rope rubbing detachment in rough sea.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

A preferred embodiment of a method for naturally culling population density on mussel culture ropes, and two preferred embodiments of predator guards to achieve such natural culling, are illustrated in the attached drawings. In these drawings;

FIG. 3 illustrates a frame member optionally usable to maintain the shape of the predator guard as illustrated in FIG. 2;

FIG. 4 illustrates a predator guard according to the second preferred embodiment, with flaps bordering the open side thereof;

FIG. 5 is a cross-section view of the hemicylindroidal predator guard illustrated in FIG. 4, as seen along line 5-5 in FIG. 4.

DETAILED DESCRIPTION OF THE PREFERRED EMBODIMENTS

Figure 1:
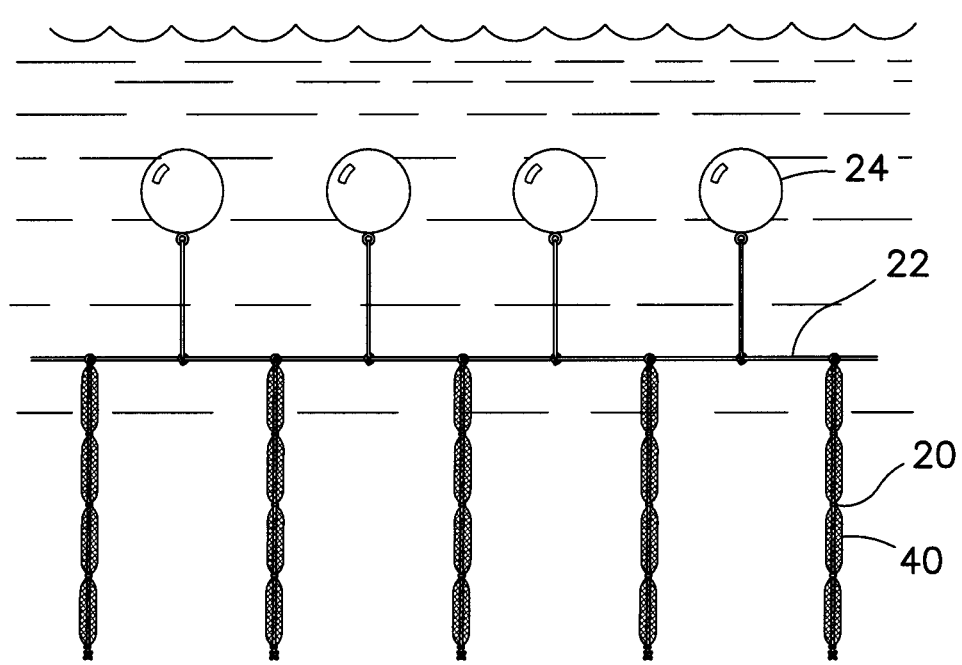
FIG. 1 is a schematic illustration of a common mussel culture installation, referred to in the industry as a "longline" installation with hanging culture ropes.

While this invention is susceptible of embodiment in many different configurations, there are shown in the drawings and will be described in details herein, two specific embodiments of an installation for naturally culling population of mussels on mussel-culture ropes. The words "natural" and "naturally" as used herein, refer to phenomena of nature. The word "culling" is used in the industry to describe a process of removing the small and undergrown mussels from a rope, allowing more space for the large and healthy-looking ones to grow.

The embodiments presented herein should be considered as examples of the principles of the invention. The two specific embodiments are also presented to explain a method for naturally culling the population of mussels on mussel-culture ropes. This method is a further embodiment of the present invention. These examples are not intended to limit the invention to the embodiments illustrated and described.

Referring to FIG. 1, a typical mussel-culture installation is illustrated. This installation is similar to the installation described in CA 2,535,821 mentioned before. This installation is made of culture ropes 20 hung to a mainline 22. The mainline 22 is suspended to buoys 24. The mainline 22 is retained at a same level by spaced-apart anchor blocks (not shown). The buoys 24 constitute markers by which a mussel-culture operation can be located and retrieved for inspection and harvest. This type of installation is referred to as a "mussel longline". Predator guard netting sleeves 40 can be seen on the culture ropes 20.

Figure 2:
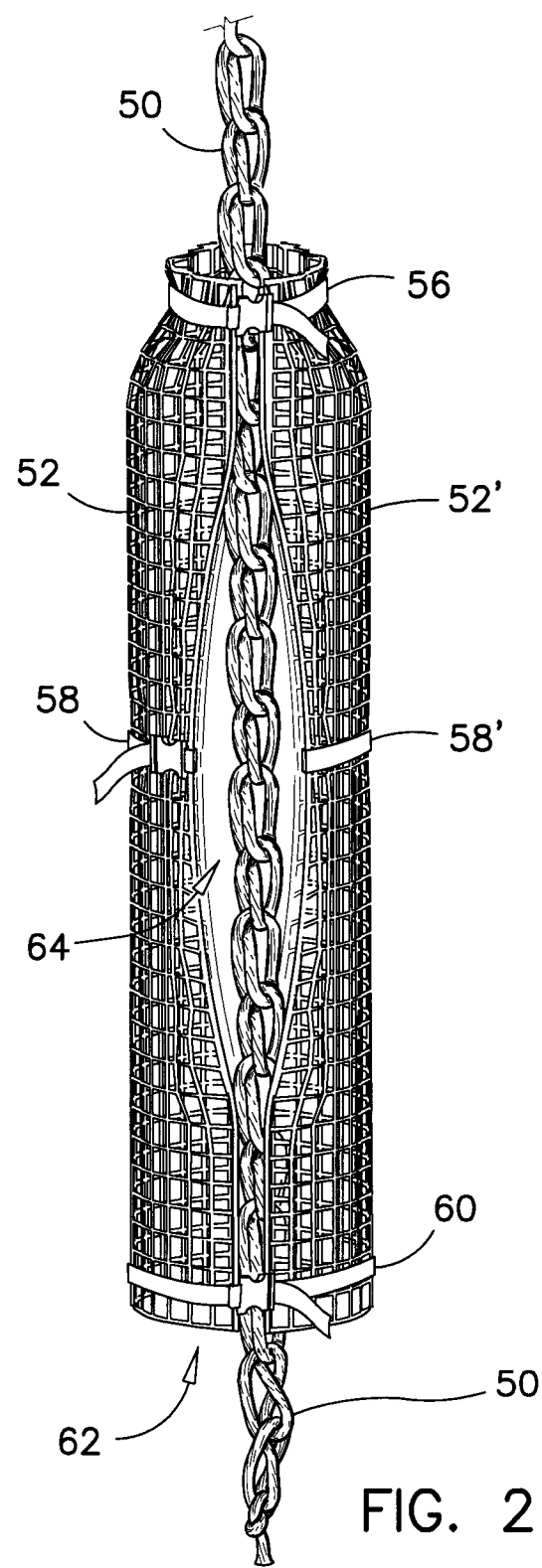
FIG. 2 illustrates a first predator guard with a selectively openable predator access breaches on each side thereof.

Referring now to FIG. 2, there is illustrated therein, a knotted mussel culture rope 50, such as described in CA 2,905,179, mentioned before. In this first preferred embodiment of a predator guard, the rope 50 is partly covered by a predator guard. This predator guard is made of two hemicylindroidal mesh surfaces 52, 52' mounted face-to-face to enclose the rope 50.

A hemicylinder is defined as half a cylinder cut longitudinally. The general shape of the mesh surface is hemicylindroidal in that it differs slightly from a hemicylinder. The mesh surface is hemicylindroidal in that its cross section may be more than or less than that of a half circle, may be at variance with the shape of a regular circle, such as an oval shape for example, and that more or less tangential extensions (flaps, not shown in FIG. 2) may extend from the open side of the hemicylindroidal surface.

The fabric of the mesh is either rigid or flexible. Preferably, the mesh is of the same fabric than that normally used for mussel culture; for protection of cultured bivalves; as used for garden fencing or for similar purpose and is made of polypropylene or similar plastic material, flexible or rigid. When the fabric of the guard is flexible, the general shape of the cross-section of the hemicylindroidal surface is optionally given by frames 54 as shown in FIG. 3.

Hemicylindroidal surfaces may be partially or completely closed at the top or at both ends by mesh or some other material. Hemicylindroidal elements may also be attached end to end as a series of guards to cover the entire length of a mussel-culture rope.

Hemicylindroidal elements are typically 1.5 m. (4 feet) long and 30 cm. (1 foot) wide. Other sizes, however, may be preferred depending on the mussel-culture operation.

Referring back to FIG. 2, two guards 52, 52' are mounted face-to-face to enclose a segment of the mussel-culture rope 50. Each guard has adjustable straps and buckles at the top 56, near the middle 58, 58', and at their bottom regions 60. The top straps 56 are preferably used to crumple the top regions of the guards 52, 52', tight against the culture rope 50 so to retain the guards 52, 52' to the rope 50.

The bottom straps 60 are used to retain the two guards 52, 52' in a cylindrical shape, with an open bottom end 62. The open bottom end 62 is preferred for letting the detaching mussel fall to the sea bed and feed crabs and starfish, for examples.

The middle straps 58, 58' are used to open a window or a breach 64 between the hemicylindroidal guards 52, 52' and to allow controlled access to the culture rope by predators. Each strap 58, 58' is preferably attached to itself, over the outside porting of each guard. Strap 58 encircles guard 52, and strap 58' encircles guard 52'. The tightness of the straps 58, 58' defines the size of the breach 64. The size of the breach 64 is adjusted by the installer of the guards 52, 52', according to experience with predator population and the nutrients present at the culture site.

The size of the breach 64 is adjusted to allow a controlled natural predation on the cultured mussels. Such controlled natural predation provides a better yield of mature mussels, and promotes a healthy presence of duck and fish in the mussel-culture habitat. This controlled natural predation promotes a natural culling of mussels on the mussel-culture ropes.

Referring now to FIG. 4, a hemicylindroidal guard 70, partially encloses the culture rope 50. The guard 70 has an open side.

As for the first preferred embodiment, the top straps 56 is used to crumple and to retain the top portion of the guard 70 to the culture rope 50.

The guard 70 has flaps 72 extending substantially tangentially therefrom. The flaps 72 extend substantially parallel to each other and border the open side of the guard. In use, the guard 70 is installed with its concave portion partly enclosing the rope 50, with the flaps 72 extending substantially parallel to each other. A gap "A" is maintained between the flaps 72.

While the gap "A" and the flexibility of the flaps 72 allows a duck to reach the open side of the guard 70, the width "W" of the flaps 72 and gap "A" are preferably set to represent a serious impediment to the mobility of a swimming duck. The adjustment of the gap "A" and width "W" of the flaps 72 is done by experience of the installer to maintain a profitable yield of healthy mussels.

For reference purposes, a more explicit diagram of the hemicylindroidal guard 70 is presented in FIG. 5. It will also be appreciated that the hemicylindroidal guard defines substantially a U-like shape, and perhaps a more oval shape which is completely open on one side. The shape of the U-shaped cross-section may be retained substantially as such by the middle and/or bottom straps 58, 60, shown in FIGS. 2 and 5.

Although a regular U-like shape, or oval shape is illustrated, deformations occur underwater, and the actual cross-section shape might be different from the illustrations presented herein. Similarly, the gap "A" of the guards in use may not be consistent along the entire length of the guards. Therefore considerations should be given to these variables when installing the predator guards.

What is claimed is:

1. A method for naturally culling mussel population on a mussel-culture rope, comprising the steps of:
    installing at least one predator guard to enclose said mussel-culture rope wherein said predator guard comprises:
    two hemicylindroidal mesh surfaces mounted face-to-face such that juxtaposed longitudinal edges form opposing seams;
    and
    during said step of installing, adjusting a degree of mussel protection of said predator guard by crumpling said predator guard and opening a breach in said predator guard in at least one of the seams.

2. The method for naturally culling mussel population on a mussel-culture rope as claimed in claim 1, wherein said step of adjusting comprises adjusting a size of said breach.

3. The method for naturally culling mussel population on a mussel-culture rope as claimed in claim 2, wherein said step of crumpling comprises tightening a fastener around a top portion of said predator guard.

4. The method for naturally culling mussel population on a mussel-culture rope as claimed in claim 1, further comprising: —installing a second and subsequent predator guards around said mussel-culture rope; and —adjusting a degree of mussel protection in said second and subsequent predator guards.

\* \* \* \* \*